United States Patent Office 3,448,176
Patented June 3, 1969

3,448,176
STILBENE-CONJUGATED DIENE BLOCK COPOLYMERS
Jaroslav G. Balas, Orinda, Calif., assignor to Shell Oil Company, New York, N.Y., a corporation of Delaware
No Drawing. Filed Nov. 18, 1963, Ser. No. 324,202
Int. Cl. C08d 3/02, 1/14
U.S. Cl. 260—880
2 Claims

ABSTRACT OF THE DISCLOSURE

Random and block copolymers of diphenylethylenes (e.g., stilbene) and conjugated dienes in a molar ratio of 0.05–1.0 are provided. An equimolar copolymer has been found to have an alternating monomer structure. The polymers are prepared by copolymerizing the diphenylethylene and conjugated diene in the presence of a hydrocarbon-substituted lithium catalyst and an ether, thioether or tertiary amine at a temperature between $-75°$ C. and $100°$ C.

---

This invention is concerned with novel copolymers, their compositions and processes for their preparation. More particularly, the invention is directed to certain alternating copolymers formed between diphenyl ethylenes and conjugated dienes.

A wide variety of polymeric materials are known in which at least one monomer utilized in their preparation is a conjugated diene such as isoprene or butadiene. On the other hand, many polymers have been formed from vinyl compounds such as styrene and the like, but one type of monomer which has not found a use for this purpose is the small class of diphenylethylenes such as 1,1-diphenylethylene or stilbene, which is trans-1,2-diphenylethylene. The formation of homopolymers from diphenylethylenes has not been achieved possibly due to steric hindrance.

When utilizing lithium-based catalysts in which living polymers are formed with conjugated dienes or styrene, it has been determined that essentially no polymerization takes place under the usual conditions when diphenylethylenes are the only type of monomer present. Diphenyl ethylenes constitute a potentially cheap monomer source if a polymerization process could be devised for utilizing them. They could be prepared, for example, by the dehydrogenative coupling of toluene and would under reasonably expected conditions be about as low cost a monomer as styrene is at the present time.

Current developments in the elastomer field are emphasizing various types of copolymers and, particularly, block copolymers wherein alternating blocks of monomers possess different characteristics, the entire block copolymer molecule exhibiting special characteristics not achieved by mere physical mixtures or random copolymers, such as the well-known styrene-butadiene copolymers finding such wide application in industry today.

Many of the conjugated diene polymers such as certain polyisoprenes and polybutadienes possess several disadvantages which the industry is attempting to correct by various means. These can broadly be referred to as poor green strength and poor processability. The lack of good processability may be due in some polyisoprenes, for example, in part to the monodisperse systems created by the catalyst employed to achieve a relatively high cis content. Because of this, the synthetic polymers are relatively difficult to process on the standard rubber processing equipment and require unduly high temperatures or extended shearing times for the incorporation of fillers, pigments, other polymers and the like.

Poor green strength on the other hand, is associated with the lack of proper cohesive forces within the mass of polymer which results in a number of disadvantages prior to vulcanization of the material. In fact, it is because of the relatively poor green strength exhibited by many synthetic conjugated diene polymers that they have not found an extensive place in the formation of tires and particularly in the preparation of tire carcasses. Natural rubber possesses substantially better green strength than do the synthetic polymers, although the physical properties of the vulcanizates may be substantially the same.

It is an object of the present invention to provide a process for the preparation of copolymers from diphenylethylenes. It is a particular object of the invention to provide novel copolymers of diphenylethylenes and conjugated dienes. It is a further object of the invention to provide improved rubber compositions. Other objects will become apparent during the following detailed description of the invention.

Now, in accordance with the present invention, novel copolymers are provided comprising copolymers of a diphenylethylene and a conjugated diene wherein the molar ratio of diphenylethylene to conjugated diene is between about 0.05 and about 1.0, preferably 1.0 at which ratio the copolymer is of the alternating type. Still in accordance with this invention, a novel block copolymer is provided having the general configuration wherein each A is a copolymer block of a diphenylethylene and a conjugated diene within the molar ratio recited above and each B is a polymer block of a monomer of the group consisting of conjugated dienes, vinyl arenes and mixtures thereof. Other types of block copolymers are provided having the configuration B—A—B wherein A and B are defined as above. Again, in accordance with the invention, compositions having improved green strength and processability comprise as the major component a homopolymer of a conjugated diene, 5–30% by weight of the described diphenylethylene-conjugated diene copolymers and 5–30% by weight of a relatively low molecular weight homopolymer of a conjugated diene, preferably having an intrinsic viscosity between about 0.1 and 1.0. Again in accordance with the invention, a process is provided for the preparation of the subject copolymers comprising polymerizing a mixture of 0.1–1.0 mol of a diphenylethylene with 1 mol of a conjugated diene in the presence of a polar compound of the group consisting of ethers, thioethers and tertiary amines at temperatures between about $-75$ and $+100°$ C. for a time between about ¼ and 24 hours.

The diphenylethylenes with which the present invention is concerned constitute an extremely small class of hydrocarbons insofar as their basic structure is concerned. The preferred species is stilbene, more fully described as trans-1,2-diphenylethylene. Also effective, however, is the corresponding cis isomer as well as the 1,1-diphenylethylene. Hydrocarbon-substituted diphenylethylenes may be used as long as the substituents contain less than about 6 carbon atoms each. Preferably, the hydrocarbyl groups should contain 1–2 carbon atoms each but the unsubstituted diphenylethylenes are preferred.

The conjugated dienes which are copolymerized with the diphenylethylenes preferably have from 4 to 8 carbon atoms each, constituting preferably butadiene, isoprene, piperylene and their higher homologues. The species having 4–5 carbon atoms per monomer molecule are preferred.

Mixtures of diphenylethylene and mixtures of conjugated dienes may be utilized in the copolymers to be described. The products derived have either elastomeric or thermoplastic properties depending in part upon the ratio of diphenylethylenes to conjugated dienes. It appears from the fact that diphenylethylenes will not homopolymerize but will copolymerize with at least an equimolar amount of a conjugated diene that the copolymeric products or the sections of the polymers comprising copolymeric sections are "alternating copolymers," by which is meant that monomeric units of diphenylethylene and of conjugated dienes alternate in the chain.

Once the diphenylethylene has been consumed in alternating copolymerization with the conjugated diene, the polymer chains may be extended by homo- or copolymerization using monomers such as further quantities of conjugated diene monomer or other copolymerizable monomers such as vinyl arenes, particularly styrene. Thus, it is possible to form a block copolymer having the structure A—B—C wherein the first block A may be polybutadiene, the second block may be an alternating copolymer block of butadiene with a diphenylethylene and the block C may be polystyrene. The proportions of these blocks may be varied to achieve desired physical properties of the final product. The greater the proportion of elastomeric blocks such as polybutadiene or polyisoprene, the more elastomeric the final products will be for a given molecular weight of the non-elastomeric or plastic blocks such as the diphenylethylene-butadiene block or polystyrene block.

The alternating copolymers forming the essential portion of the copolymers of the present invention are prepared by polymerization in the presence of an alkali metal-based catalyst and in the presence of a polar compound of the group consisting of ethers, thioethers and tertiary amines. Alkali metal-based catalysts useful for the present process include alkyl lithiums (n-butyl lithium, sec-butyl lithium); aryl lithiums (naphthyl lithium, tolyl lithium); dilithioalkanes and aryl-substituted alkanes (dilithiotetraphenylbutane, 1,4-dilithiobutane) and their sodium or potassium analogs.

The initial stage in the polymerization process will be governed by the final product desired. For example, if it is desired to form a block copolymer having an elastomeric midsection with non-elastomeric terminal blocks, it is preferred to utilize an initiator capable of dianionic initiation together with butadiene, thus forming an initial polybutadiene block terminated on both ends with lithium and thereafter add a diphenyl ethylene with or without further proportions of a conjugated diene. If monomeric conjugated dienes still remain in the system, no further proportions thereof need be added as long as the molar ratio of diphenyl ethylene to conjugated diene is less than one. In order to effectively modify the properties of the final product from others obtained without the use of diphenylethylene, the mole fraction of the latter in any alternating copolymer or block thereof should be at least 0.05 and up to 0.5, preferably 0.5. It is a preferred practice when preparing the block copolymers having a mol ratio of diphenylethylene to conjugated diene substantially less than 1 to polymerize conjugated diene in the substantial absence of diphenylethylene and thereafter add the diphenylethylene at such a time that an equimolar proportion of conjugated diene remains.

In accordance with one aspect of the present invention, it is desirable to utilize coupling reactions forming for example, the block copolymer A—B—Li which is a living polymer terminated with lithium in which the polymer block A is an alternating copolymer of diphenyl ethylene and a conjugated diene and the polymer block B is a conjugated diene polymer thereafter adding a coupling agent such as a dihalohydrocarbyl such as dibromoethane and coupling two of the block copolymers together, thus forming the product A—B—B—A.

Other coupling agents, such as divinyl arenes (e.g., divinyl benzene) may be employed to synthesize block polymers having branched structures. Coupled products may also be formed by preparing the living polymer A—B—Li and mixing therewith a desired proportion of a homopolymer such as polybutadiene terminated with lithium. This will form still another type of block copolymer when coupled by means of the types of coupling agents suggested herewith.

Since the copolymerization does not proceed satisfactorily in a non-polar medium it is necessary to conduct the polymerization in the presence of certain aprotic polar compounds comprising ethers, thioethers, tertiary amines or mixtures thereof. Typical polar compounds which may be added include dimethyl ether, diethyl ether, ethyl methyl ether, ethyl propyl ether, dioxane, dibenzyl ether, diphenyl ether, dimethyl sulfide, diethyl sulfide, tetramethylene oxide (tetrahydrofuran), tripropyl amine, tributyl amine, trimethyl amine, pyridine and quinoline. The proportion of polar compounds may be adjusted to suit the species of monomers utilized and for promoting certain desired configurations of portions of the plymer which comprise essentially conjugated diene polymer blocks. For example it is preferred to achieve a high cis structure in the latter types of blocks since these appear to have optimum physical properties. For this purpose, the polar compounds should be at a minimum during the polymerization process in which those blocks are formed. It is preferred that the molar proportion of polar compound to lithium initiator be between about 1 and 10 although greater proportions can sometimes be used, particularly where a high cis structure is not required.

The process may be carried out in the presence of supplementary substantially inert solvents which are usually non-polar materials such as alkenes, alkanes or aromatic hydrocarbons which are preferably liquid at the temperature of polymerization. On the other hand, these solvents may be modified by the presence of a relatively low boiling solvent which will volatilize and be condensed during the polymerization for the purpose of temperature control.

The average molecular weight of the copolymers of this invention may vary widely depending on the end use intended. When they are to be employed per se for the purpose of thermoplastics or molded articles, the alternating block copolymer should have an average molecular weight between about 20,000 and 2 million, preferably between about 50,000 and 500,000. When block copolymers are to be formed having elastomeric properties, it is preferred that the terminal alternating copolymer blocks as described hereinbefore have average molecular weights between about 7,500 and 45,000 while the center elastomeric polymer block of conjugated diene should have an average molecular weight between about 50,000 and 300,000.

The polymers produced by the process of the present invention are thermoplastic as contrasted to elastomeric when the average polymer chain comprises a ratio of diphenylethylene to conjugated diene between about 1:1 and 1:4.5. As the proportion of conjugated diene increases in the polymer chain, the product becomes progressively more elastomeric although the composition has a modulus of elasticity which is usually higher than a homopolymer of a conjugated diene of similar average molecular weight. The polymers may be added to polystyrene or utilized in the formation thereof to modify the properties of the product. As the proportion of conjugated diene in the copolymer increases the copolymer will materially improve the impact strength of the polystyrene composition containing them.

As suggested hereinbefore, many of the copolymers of the invention may be used to improve the properties of the useful high molecular weight homopolymers of conjugated dienes such as polyisoprene and polybutadiene rubbers. It is preferred to combine cements of these two components and thereafter coagulate the rubbers to form a composition which is an intimate mixture of the two components. Still further increase in the effect of the copolymers is achieved by subjecting the compositions to a high rate of shear either during coagulation or subsequent thereto. Since the copolymers are preferably formed in a homogeneous system, this results in the final product being a polymer cement. The cement may be used as such for coating purposes, for blending with other cements for the formation of latex or for the coagulation to form rubber crumb. Latices may be formed from the block copolymers and the alternating copolymers of the invention and these in turn may be employed not only for coating purposes but for the formation of foam to be utilized for insulation purposes and other commercial end uses. Coagulation of the copolymers is achieved by flashing off the solvent present during the polymerization, preferably by subjecting it to the action of steam and/or hot water. Thereafter, the rubber crumb is subjected to the usual drying procedures, preferably below the temperature at which any appreciable thermal decomposition occurs.

The following examples illustrate the process and products of the present invention.

Example I

A small proportion of normal butyl lithium was added to a solution of stilbene in tetrahydrofuran. A red color characteristic of the benzyl anion rapidly develops. After an initial small drop in stilbene concentration, a long period followed during which the monomer concentration remained almost constant. However, upon the introduction of butadiene, the remaining stilbene rapidly disappears. The results were interpreted to mean that butyl lithium is capable of adding to stilbene but the resulting benzylic anion is too stable to add at any appreciable rate to an additional molecule of stilbene. That is, stilbene cannot homopolymerize under these conditions. In the presence of butadiene, however, stilbene can copolymerize.

Example II

Two copolymers of stilbene and butadiene were prepared, the starting molar concentration of butadiene to stilbene being 3:1 and 1:1 respectively. Analysis during the course of the polymerization indicated that alternating polymerization occurred during that portion in which the two monomers were present in the system. The polymerizations were carried out in tetrahydrofuran at 25° C. for several hours. The 1:1 copolymer had an intrinsic viscosity of 0.47 dl./g. in toluene at 25° C. When pressed into a transparent sheet the product was hard and brittle and was not softened by boiling water. In contrast, the 3:1 copolymer when pressed into a sheet was opaque, less brittle and was softened by boiling water. The 1:1 copolymer had a vicat softening point of about 116° C. which is 20–25° higher than the softening point of polystyrene. Similar results were obtained by substituting isoprene for butadiene in the preparation of a 1:1 copolymer of stilbene and isoprene. The pressed product was also very clear and brittle.

Example III

The high softening point of the stilbene-butadiene copolymer indicates that this would be a useful end block in a block copolymer of the structure A—B—A as defined hereinbefore. Such a block copolymer was prepared utilizing lithium naphthalene as the polymerization initiator. The reaction was carried out at −40 to −60° C. in tetrahydrofuran over a period of 25 hours. An initial block of polybutadiene was formed after which stilbene was added while some butadiene monomer was still present. Since the polymerization was di-initiated, the resulting block copolymer had the structure, poly[(butadiene-alt-stilbene)-b-(polybutadiene)-b-(butadiene-alt-stilbene)].

The average molecular weight of the blocks of this copolymer were calculated to be about 25,000–123,000–25,000, respectively. The product had an intrinsic viscosity of 1.24 dl./g. The intrinsic viscosity of the initial polybutadiene block was 0.84 dl./g. The product had a tensile strength at break of 1,975 p.s.i.; a 500% modulus of 1,870 p.s.i. and an elongation at break of 500+%.

Example IV

An attempt was made to homopolymerize 1,1-diphenylethylene in tetrahydrofuran at 5° C. utilizing butyl lithium as the initiator. Essentially no polymerization took place in the course of 80 minutes, after which an equimolar amount of butadiene was added. Within 2 hours more than half of the diphenylethylene had copolymerized with butadiene and at the end of 10 hours about 85% of the two monomers had copolymerized. The copolymer so obtained was a clear, brittle plastic having an intrinsic viscosity of 0.45 dl./g. and a softening point of 107.5° C.

I claim as my invention:

1. A thermoplastic block copolymer having the general structure A—B—A wherein each A is a copolymer block of a diphenylethylene selected from the group consisting of 1,1 diphenylethylene and 1,2 diphenylethylene and a conjugated diene selected from the group consisting of butadiene and isoprene, the molar ratio of diphenylethylene to diene being between 0.05 and 1.0, and B is a polymer block of a monomer of the group consisting of $C_4$ and $C_5$ conjugated dienes, th ratio of diphenylethylene to total conjugated diene content being between about 1:1 and 1:4.5.

2. A thermoplastic block copolymer having the general configuration B—A—B wherein A is a copolymer block of a diphenylethylene selected from the group consisting of 1,1 diphenylethylene and 1,2 diphenylethylene and a conjugated diene selected from the group consisting of butadiene and isoprene, the molar ratio of diphenylethylene to diene being between about 0.05 and 1.0 and B is a polymer block of a monomer of the group consisting of $C_4$ and $C_5$ conjugated dienes, the ratio of diphenylethylene to total conjugated diene content being between about 1:1 and 1:4.5.

References Cited

UNITED STATES PATENTS

| 3,317,918 | 5/1967 | Foster | 260—83.7 |
| 2,962,488 | 11/1960 | Horne | 260—94.7 |
| 3,251,905 | 5/1966 | Zelinski | 260—880 |
| 3,265,765 | 8/1966 | Holden et al. | 260—880 |

FOREIGN PATENTS

| 827,365 | 2/1960 | Great Britain. |

OTHER REFERENCES

Maruel et al.: Journ. Amer. Chem. Soc., vol. 76, pp. 5434–5435, November 1954.

Doak et al.: Journ. Amer. Chem. Soc., vol. 73, pp. 1084–1087, March 1951.

GEORGE F. LESMES, Primary Examiner.

U.S. Cl. X.R.

260—2.5, 83.7, 84.3, 84.7, 876, 879